United States Patent
Hoashi et al.

(10) Patent No.: US 9,346,507 B2
(45) Date of Patent: May 24, 2016

(54) FRONT STRUCTURE OF STRADDLE TYPE VEHICLE

(75) Inventors: Taiki Hoashi, Wako (JP); Gen Tanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 541 days.

(21) Appl. No.: 13/489,543

(22) Filed: Jun. 6, 2012

(65) Prior Publication Data

US 2012/0314435 A1 Dec. 13, 2012

(30) Foreign Application Priority Data

Jun. 10, 2011 (JP) ................................. 2011-130427

(51) Int. Cl.
*B62J 6/00* (2006.01)
*B62J 17/02* (2006.01)
*B62J 6/02* (2006.01)

(52) U.S. Cl.
CPC ...... *B62J 17/02* (2013.01); *B62J 6/005* (2013.01); *B62J 6/02* (2013.01)

(58) Field of Classification Search
CPC ............... B62J 6/02; B62J 6/005; B62J 17/02
USPC ............................ 362/476, 543, 548, 549, 370
See application file for complete search history.

(56) References Cited

U.S. PATENT DOCUMENTS

| 7,401,953 B2 * | 7/2008 | Isayama | 362/474 |
|---|---|---|---|
| 7,556,410 B2 * | 7/2009 | Nakano et al. | 362/469 |
| 2012/0236583 A1 * | 9/2012 | Ochiai | B60Q 1/2607 362/519 |

FOREIGN PATENT DOCUMENTS

| EP | 1908630 A2 * | 9/2008 | ............... B60Q 1/00 |
|---|---|---|---|
| JP | 10-147272 A | 6/1998 | |
| JP | 3509457 B2 | 3/2004 | |

* cited by examiner

*Primary Examiner* — Sharon Payne
(74) *Attorney, Agent, or Firm* — Birch, Stewart, Kolasch & Birch, LLP

(57) ABSTRACT

A separate member is provided in the space between the side portion of headlight and the side cowl. A front structure of straddle type vehicle includes a joint portion that can be precisely positioned, while an increase in the width of the front portion of side cowl is prevented. A separate air intake cover is provided between the side portion of the headlight and the side cowl and is attached to the headlight stay with the headlight, simultaneously. The side cowl engaging portions is disposed behind the side cowl and with which the side cowl is engaged in the vicinity of the joint portion with the side cowl.

20 Claims, 19 Drawing Sheets

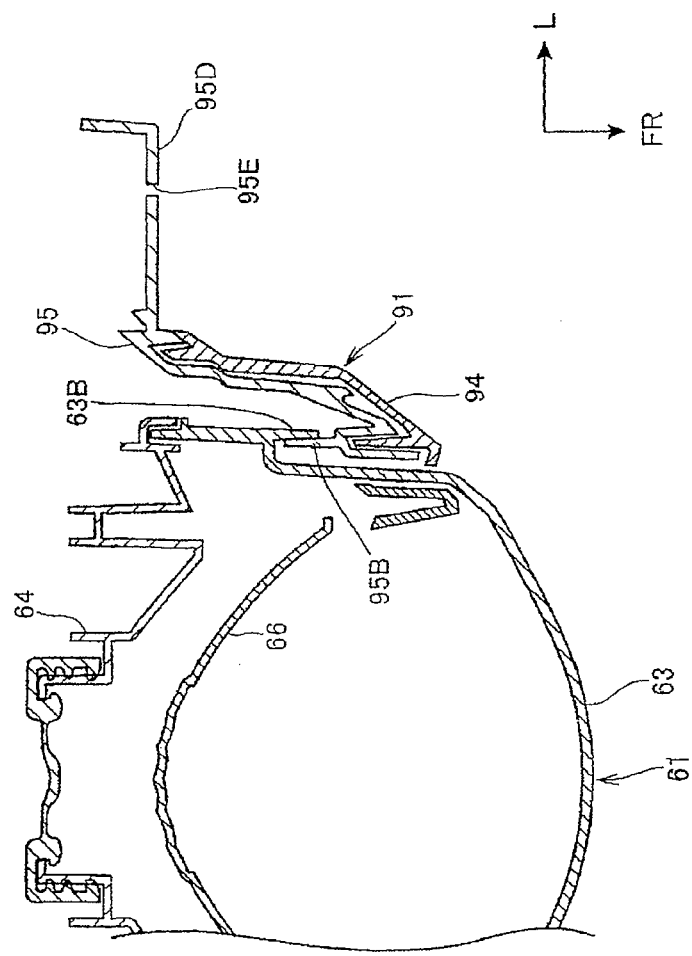

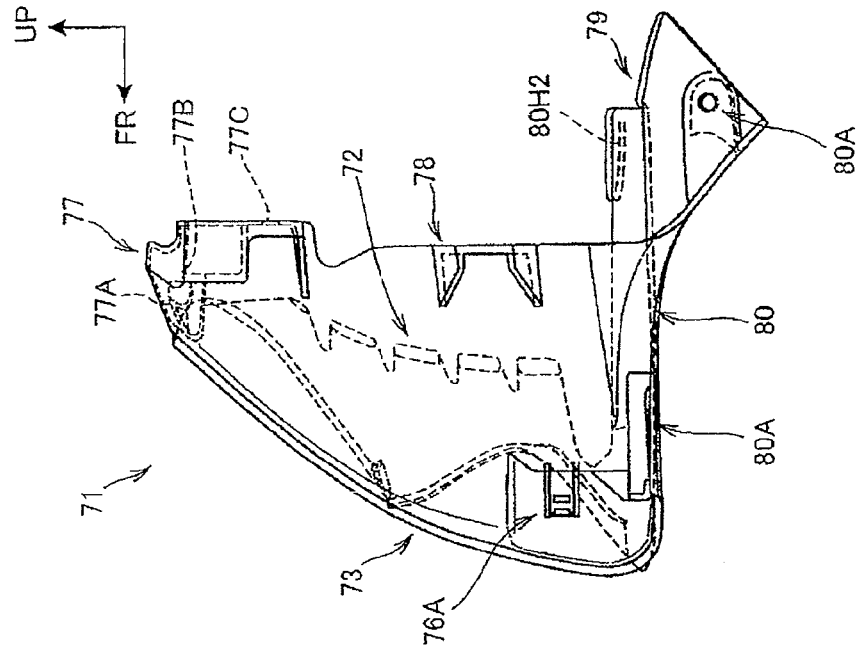
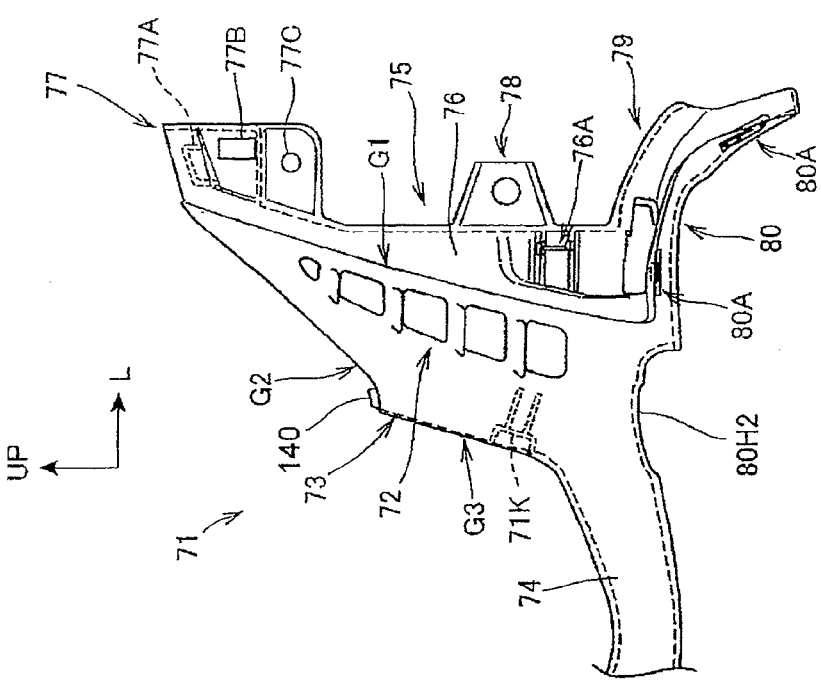
Fig. 10(A)
Fig. 10(B)

FRONT STRUCTURE OF STRADDLE TYPE VEHICLE

CROSS-REFERENCE TO RELATED APPLICATIONS

The present application claims priority under 35 USC 119 to Japanese Patent Application No. 2011-130427 filed Jun. 10, 2011 the entire contents of which are hereby incorporated by reference.

BACKGROUND OF THE INVENTION

1. Field of the Invention

The present invention relates to a front structure of straddle type vehicle including right and left of side cowls arranged in front portion of a body frame with a cowl stay provided on the front portion of the body frame. A headlight stay supporting a headlight is attached to the cowl stay.

2. Background of the Invention

A motorcycle is known that includes a body frame, right and left of side cowls arranged in front of a body frame with a cowl stay (rear brace) provided on the front portion of the body frame. A headlight stay (front brace) for supporting a headlight is supported on the cowl stay with a part of the side cowl being supported on the headlight stay. See, for example, Japanese Patent Application Publication No. 3509457. Both the side cowl and headlight are attached to the same headlight stay. A precise positioning of the joint portion of the side cowl and the headlight can be achieved. Moreover, since an upper panel and a lower panel arranged between the side cowls are fixed on the side cowl, the joint portion with the side cowl can be precisely positioned.

In a conventional structure, separate components are interposed between a side portion of the headlight and the side cowl. However, the structure which configures the joint portion of the separate component and the other components (such as the headlight and the side cowl) is not disclosed.

With a conventional structure, if the separate components are installed between the side portion of headlight and the side cowl, when both the headlight and the side cowl are attached to the headlight stay, the headlight stay is needed to be extended to the outer side in the width direction of the vehicle than the separate components. Thus, the width of the front portion of the side cowl would be increased. Increasing the width of the front portion of the side cowl causes a problem such as an increase in wind resistance and an enlargement of the cowl.

SUMMARY AND OBJECTS OF THE INVENTION

In light of the above-mentioned circumstance, the present invention aims to provide a front structure of straddle type vehicle wherein the separate components arranged between the side portion of headlight and the side cowl can be precisely position to prevent an increase in the width of front portion of the side cowl.

To solve the above-mentioned problem, according to an embodiment of the present invention a front structure of straddle type vehicle includes a body frame (2); right and left of side cowls (81) arranged in front of the body frame (2) and a cowl stay (51) provided on the front portion of the body frame (2) wherein a headlight stay (53) supporting a headlight (61) is attached to the cowl stay (51). A separate intermediate member (71) is positioned between a side portion of headlight (61) and the side cowl (81), the intermediate member (71) is attached to the headlight stay (53) with the headlight (61), simultaneously, and has side cowl engaging portions (77B, 76A) with which the side cowl (81) is engaged in the vicinity of the joint portion with the side cowl (81).

According to an embodiment of the present invention, since the separate intermediate member between the side portion of headlight and the side cowl is attached to the headlight stay with the headlight, the intermediate member and the headlight can be precisely positioned. Moreover, since the intermediate member has a side cowl engaging portion where the side cowl is engaged in the vicinity of the joint portion of the intermediate member (71) with the side cowl, the intermediate member and the side cowl can be precisely positioned. Therefore, in a structure with separate components between the side portion of headlight and the side cowl, precisely position is achieved while preventing an increase in the width of the front portion of side cowl.

In the above-mentioned structure, a blinker (91) is provided so as to be attached to the headlight stay (53) and to be adjacent to the right and left sides of the headlight (61) and to the upper of the intermediate member (71). The blinker (91) may have an intermediate member engaging portion (94A) disposed behind the intermediate member (71) and engaged with the intermediate member (71) in the vicinity of the joint portion with the intermediate member (71). According to this structure, since the headlight and the blinker are adjacent to each other and fixed on the same headlight stay, while they are precisely positioned, the headlight and the blinker can be sub-assembled as an integral combination lamp on the headlight stay. In addition, since the blinker is engaged with the intermediate member, the blinker and the intermediate member can be precisely positioned.

Moreover, in the above-mentioned structure, the blinker (91) has a blinker lamp (92), a lens (94), and a housing (95). The intermediate member (71) and the housing (95) of the blinker (91) are attached with an attachment member (112), the attachment member (112), the side cowl engaging portion (77B) and the intermediate member engaging portion (94A) may be provided adjacent to each other. According to the structure, since the attachment or engaging position of the intermediate member is adjacent to the blinker and the side cowl, these components can be more easily and precisely positioned.

Accordingly, the combination lamp has an external appearance which looks as if the headlight and the blinker are integrally formed even though the headlight and the blinker are separate components.

Moreover, in the above-mentioned structure, the headlight (61) has the lamp (62), the lens (63) and the housing (64). The lens (63) of the headlight (61) may have blinker engaging portions (63A, 63B) engaged with the blinker (91) to integrate the headlight (61) and the blinker (91). According to the structure, the joint portion of the separate headlight and blinker can be precisely positioned, which results in an increase in the external appearance as a combination lamp.

Moreover, in the above-mentioned structure, the blinker (91) has the blinker lamp (92), the lens (94), and the housing (95). The lens (94) of the blinker (91) may have a side cowl engaging portion on the blinker side (94C) engaged with the side cowl (81). According to this structure, the blinker and the side cowl are more easily and precisely positioned. Accordingly, the joint portion can be precisely positioned.

In addition, in the above-mentioned structure, a lower plate portion (120) of the headlight stay (53) and a lower plate portion (80) of the intermediate member (71) are arranged under the optical axis adjusting portion (131) of the headlight (61). A hole portion (80H) communicated with the optical axis adjusting portion (131) or cutout portions (80H2, 120H1) may be provided in both of the lower plate portions (120, 80). According to the structure, access to the optical axis adjusting portion provided behind the headlight stay and the intermediate member makes aiming possible.

Moreover, in the above-mentioned structure, the headlight stay (53) may be formed narrower than the intermediate member (71). According to this structure, the situation wherein the headlight stay causes an increase in the width of the front portion of side cowl can surely be prevented. Thus, the width of the front portion of side cowl can be efficiently reduced.

According to an embodiment of the present invention, a separate intermediate member is installed between the side portion of headlight and the side cowl, the intermediate member is attached to the headlight stay with the headlight, simultaneously, and has the side cowl engaging portion where the side cowl is engaged in the vicinity of the joint portion with the side cowl. Therefore in a structure with separate component between the side portion of headlight and the side cowl the precisely positioning can be prevented while an increase in the width of the front portion of side cowl can be prevented.

When the blinker attached to the headlight stay and being adjacent to the right and left of the headlight and to the upper of the intermediate member has the intermediate member engaging portion disposed behind the intermediate member and engaged with the intermediate member in the vicinity of the joint portion with the intermediate member, the headlight and the blinker are precisely positioned. Simultaneously, the headlight and the blinker can be sub-assembled as an integral combination lamp on the headlight stay, in addition, the blinker and the intermediate member can be precisely positioned.

In addition, the blinker has the blinker lamp, the lens, and the housing. When the intermediate member and the housing of the blinker are attached with the attachment member, the attachment member, the side cowl engaging portion and the intermediate member engaging portion are provided to be adjacent to each other, the attachment or engaging position of the intermediate member are adjacent to those of the blinker and the side cowl. Thus, these components can be more easily and precisely positioned. Accordingly, the combination lamp has an external appearance which looks as if the headlight and the blinker are integrally formed even though the headlight and the blinker are separate components.

Moreover, when the headlight has the lamp, the lens and the housing, and the lens of the headlight has the blinker engaging portions engaged with the blinker to integrate the headlight and the blinker, the joint portion of the separate headlight and blinker can be precisely positioned, which results in increasing the external appearance as a combination lamp.

In addition, when the blinker has a side cowl engaging portion on the blinker side engaged with the side cowl, the blinker and the side cowl are more easily and precisely positioned. Accordingly, the joint portion can be precisely positioned.

In addition, when the lower plate portion of the headlight stay and the lower plate portion of the intermediate member are arranged under the optical axis adjusting portion of the headlight, and a hole portion communicated with the optical axis adjusting portion or the cutout portion are provided in both of the lower plate portions, accordingly, access to the optical axis adjusting portion provided behind the headlight stay and the intermediate member makes optical axis adjustment possible.

Moreover, when the headlight stay is formed in narrower than the intermediate member, the situation wherein the headlight stay causes an increase in the width of the front portion of side cowl can surely be prevented. Thus, the width of the front portion of side cowl can be efficiently reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9 is a cross section of IX-IX in FIG. 7;

FIG. 10(A) is a front view of the air intake cover and FIG. 10(B) is a side view;

DETAILED DESCRIPTION OF THE PREFERRED EMBODIMENTS

Hereinafter, one embodiment of the present invention will be explained with reference to the drawings. Moreover, in the explanation, the described directions such as front-and-rear, left-and-right and up-and-down are the same as the directions toward the vehicle body without any special description. Moreover, a sign FR shown in each drawing shows the forward direction of the vehicle body, a sign UP shows the upper of the vehicle body, and a sign L show the left of the vehicle body.

Figure 1:
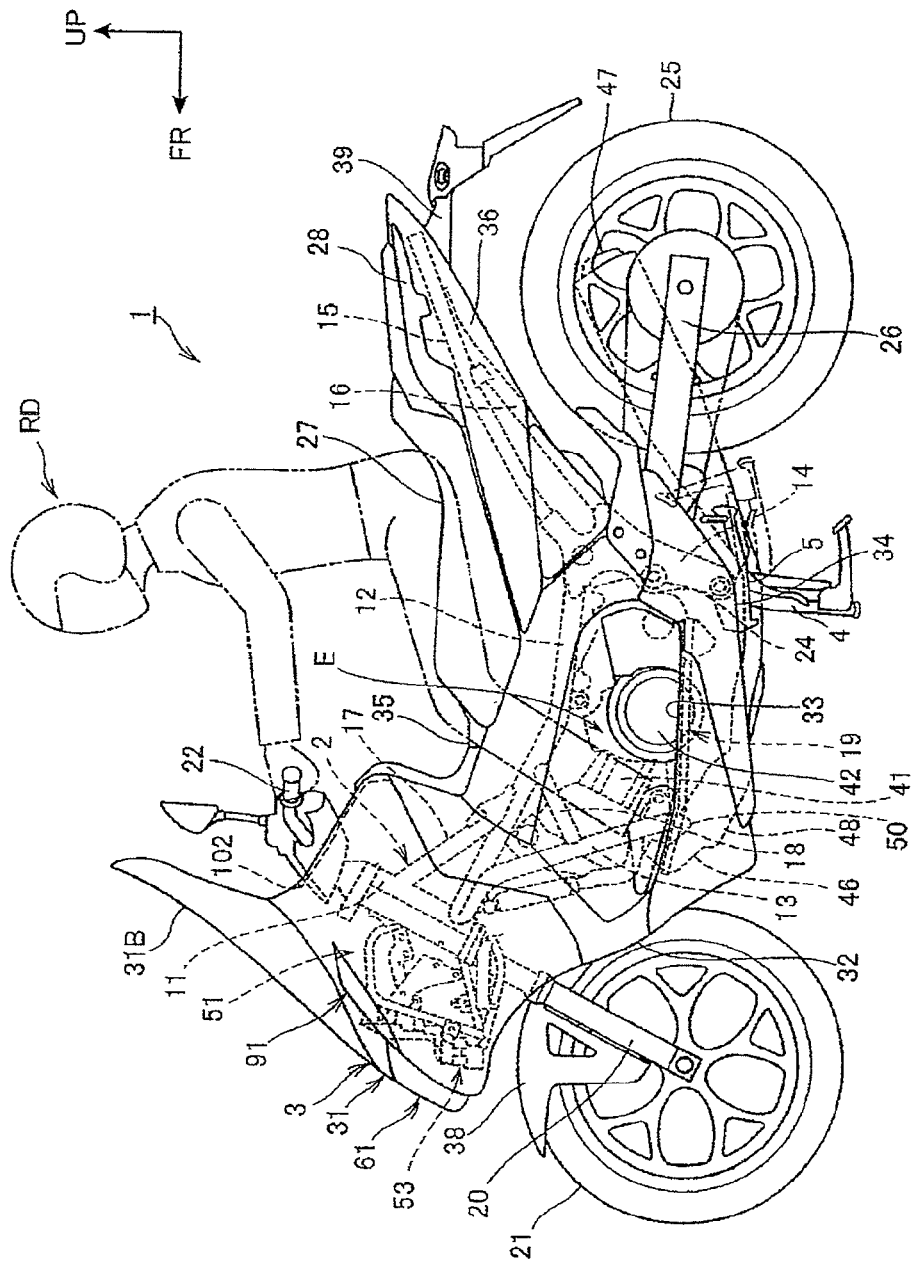
FIG. 1 is a side view of a motorcycle according to the embodiment of the present invention.

FIG. 1 is a left side view of a motorcycle 1 according to the embodiment of the present invention. FIG. 1 shows the state wherein a rider (driver) RD is riding. A body frame 2 of the motorcycle 1 is integrally jointed such as by welding a plurality of kinds of metallic components, and includes a head pipe 11; a right and left pair of main frames 12 extending downward to the rear direction from a head pipe 11; a right and left pair of down frames 13 extending downward from the main frame 12 and supporting the front end portion of an engine E; a right and left pair of pivot frames 14 connected to the rear end portion of the main frame 12; a right and left pair of seat rails 15 connected to the rear portion of the pivot frame 14 and extending upwardly to the rear direction and a back stay 16 bridging between the pivot frame 14 and the seat rail 15.

Frames (head pipe 11, main frame 12, down frame 13, seat rail 15, back stay 16) except the pivot frame 14 of the body frame 2 are formed by metallic pipes made of metallic material including steel, the pivot frame 14 is formed by plate members made of metallic material and the like. In addition, in the drawings, an upper portion reinforcing frame 17 bridges between the head pipe 11 and the main frame 12 and a lower portion reinforcing frame 18 bridges between the main frame 12 and the down frame 13.

The head pipe 11 is arranged inclined upwardly toward the rear, at the center in the width direction of the front part of the vehicle, and supports a right and left pair of front forks 20 steerable to the right and left. A front wheel 21 is rotatably supported on the lower portions of the front forks 20. A handle bar 22 for steering is supported on the upper portion of the front fork 20. In short, the head pipe 11 supports a steering unit comprising a steering system of the motorcycle 1.

Right and left main frames 12 extend to be inclined downwardly to the rear direction when viewed from the lower right and left sides of the head pipe 11. The rear end thereof is connected to the front upper portion of the right and left of pivot frames 14. Right and left pivot frames 14 extend from the rear portion to the lower direction of the right and left of main frames 12, and support a pivot shaft 24 on the upper and lower middle portion. The pivot shaft 24 is supported along the width direction of the vehicle and vertically and swingably supports a swing arm 26, which pivotally supports a rear wheel 25 on the rear portion thereof.

An engine (combustion engine) E is supported in the front lower portion of the vehicle body, where is surrounded by the main frame 12, the down frame 13 and the pivot frame 14. A seat 27 is supported above the engine E.

The seat 27 is formed into an integrated seat extending rear and front, wherein the driver and a pillion passenger can straddle and be seated. The seat is supported on the right and left pair of seat rails 15.

In addition, the motorcycle 1 is configured in a full cover type, which has a body cowl 3 covering approximately the entire body frame 2. The motorcycle 1 has a center stand 4 parking the vehicle body in a posture which is upright to the ground, and a side stands 5 parking the vehicle body in a posture inclined to the left side.

The engine E is a lean forward engine wherein a cylinder portion 41 is vertically arranged from the front part of a crank case 42 upwardly toward the front, and is supported on the body frame 2 through a plurality of engine brackets 50. An engine inlet system (not shown) is connected to the back side of the cylinder portion 41. An exhaust pipe 46 is connected to the front surface of the cylinder portion 41. An exhaust pipe 46 extends under the engine E in the rear direction and is connected to an exhaust muffler 47 disposed in the right side of the rear wheel 25. A catalytic converter 48 is provided in the middle of the exhaust pipe 46 (the part in the vicinity of the cylinder portion 41). An engine exhaust system comprises the exhaust pipe 46, the exhaust muffler 47, and the catalytic converter 48 for cooling the engine is fixedly arranged front and upper of the engine E.

The body cowl 3 comprises a front cowl 31 covering the front portion of the vehicle body including the head pipe 11, right and left pair of leg shields 32 covering the front part of rider RD's feet connecting to the front cowl 31, right and left pair of step portions 33 extending from the lower portion of the leg shield 32 in the rear direction, An under cover 34 covering the lower portion of the step portion 33, a center tunnel portion 35 covering the main frame 12 from the upper, the rear cover 36 connected to the step portion 33 and the center tunnel portion 35, and covering the seat rail 15 and the buck stay 16.

The step portion 33 is a member on which the rider RD puts his/her feet when seated on the seat 27. The step portion 33 is a floor step which is long to the rear and the front extends approximately and horizontally to the right and left of the engine E. A right and left pair of supporting frames 19 extending to the rear and to the front and to the right and left of the engine E are provided on the body frame 2, to support the step portion 33 which is longitudinally long. A right and left pair of step portion 33 are fixed on the right and left pair of supporting frames 19, respectively. In addition, a front fender 38 is provided above the front wheel 21. A rear fender 39 is provided above the rear wheel 25. A right and left pair of grab rails 28 is provided on the right and left of rear portions of the sitting seat 27.

Figure 2:
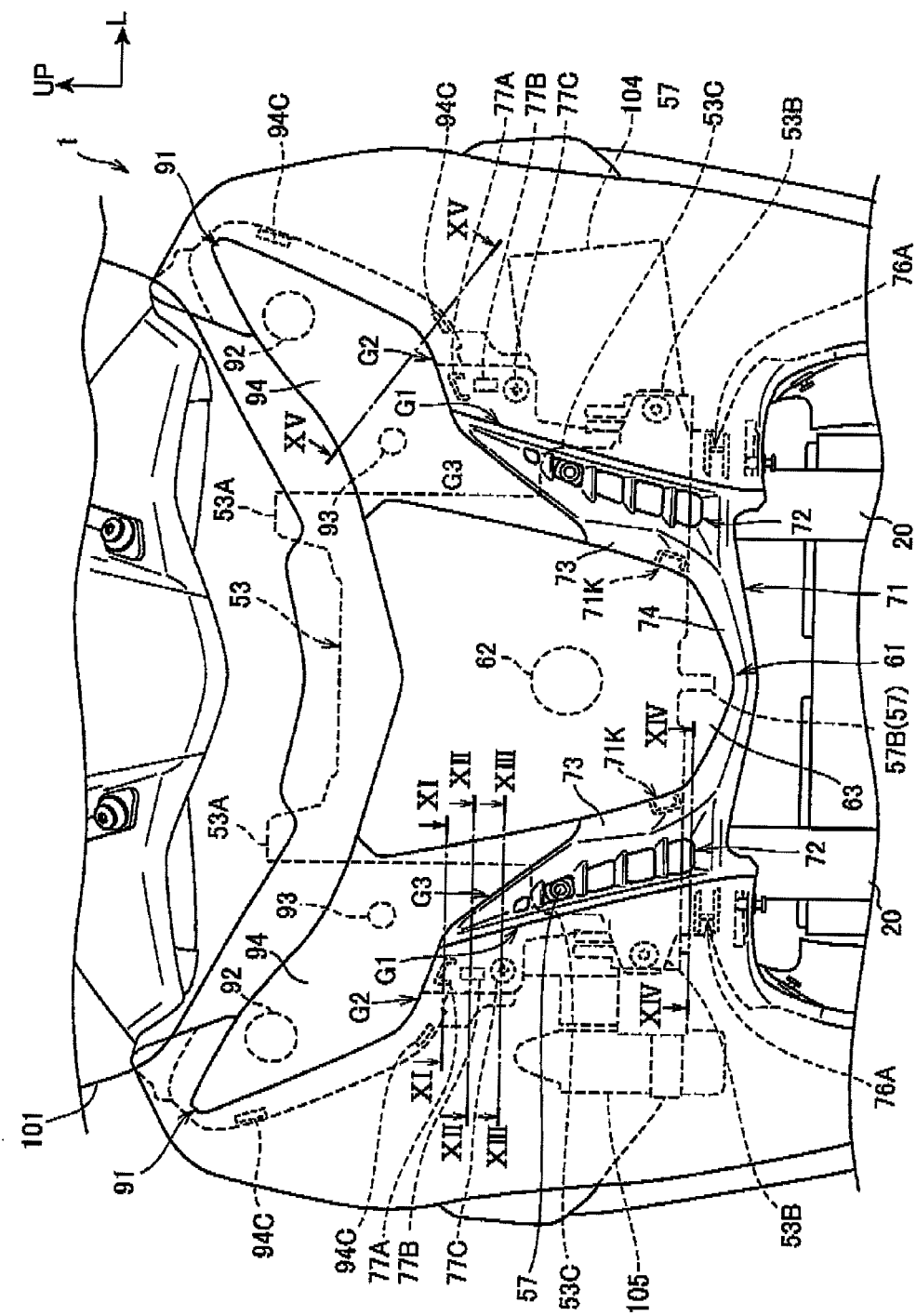
FIG. 2 is a front view showing the front cowl with the peripheral structure.

FIG. 2 is a front view showing the front cowl 31 with the peripheral structure.

Figure 16:
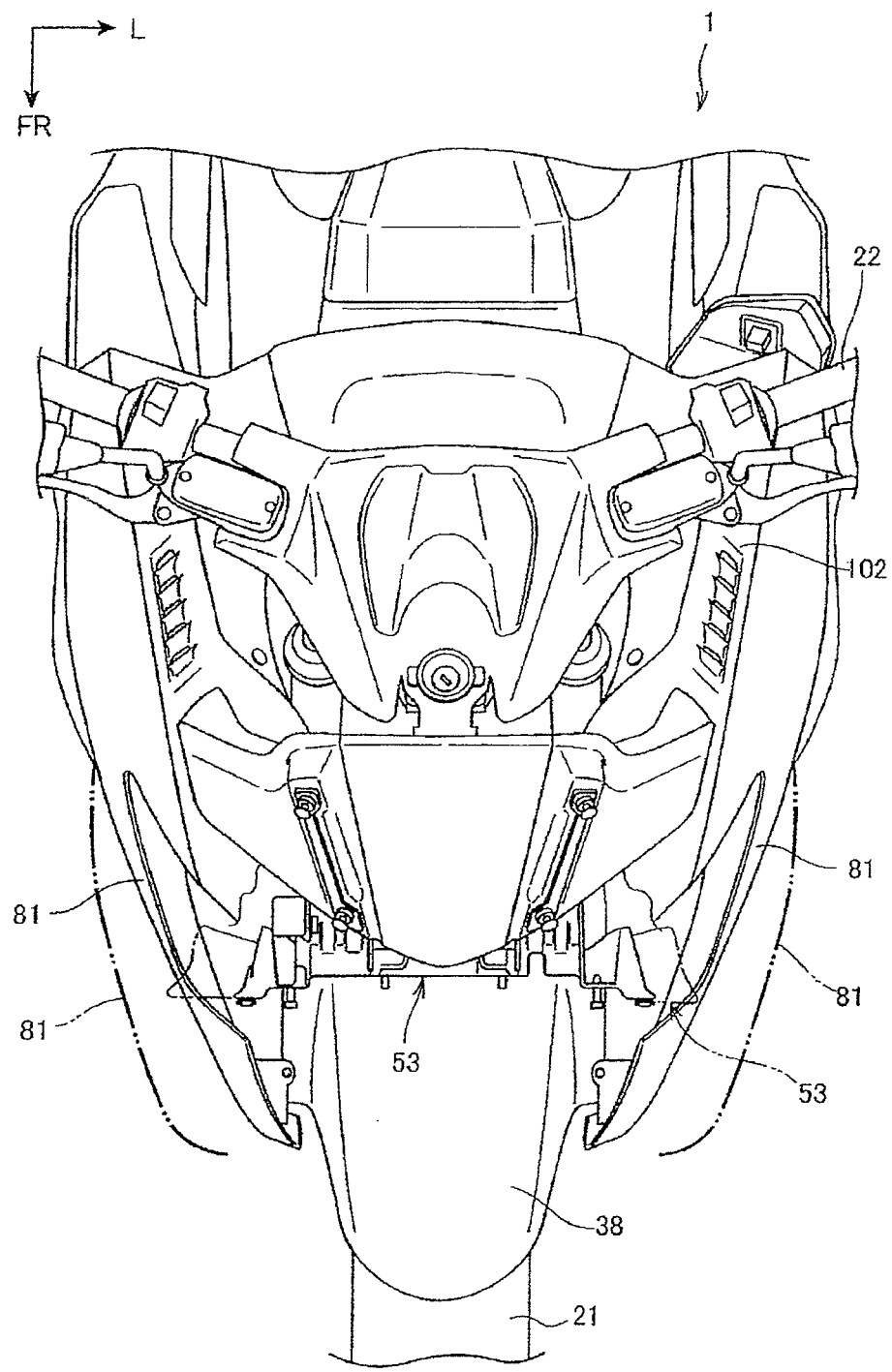
FIG. 16 is drawing of front cowl viewed from the upper side with the peripheral structure.

As shown in FIG. 1 and FIG. 2, front cowl 31 forms a large cowl covering the front of the rider RD, and increases the comfortability for the rider RD. The front cowl 31 includes a headlight 61 disposed at a center in the width direction of the vehicle; the air intake cover 71 continues to the right and left of the headlight 61; a right and left pair of side cowls 81 continued to the right and left of air intake cover 71 and a right and left pair of blinkers 91 extend from the headlight 61 along the air intake cover 71 and the upper end of the side cowl 81. A wind screen 101 (see FIG. 1) is positioned above the headlight 61 and the blinker 91 and is inclined upwardly to the rear direction. Garnish 102 (see FIG. 16 described later) is a cover component covering between the rear and upper portions of the side cowl 81 and the body frame 2.

The side cowl 81, as shown in FIG. 1, extends to the right and left of the head pipe 11 in the front and rear direction, is arranged in front of the body frame 2, and is formed as a large resin cowl covering the space from the headlight 61 to be adjacent to the handle bar 22 when viewed from the side of the vehicle body.

A cowl stay 51 (see FIG. 1) to support the front cowl 31 is attached to the head pipe 11. The cowl stay 51 has a pipe frame structure extending forward of the head pipe 11. A headlight stay 53 to support the headlight 61 is attached to the front portion of the cowl stay 51.

In FIG. 1, a part of the cowl stay 51 is shown. The cowl stay 51 extends to the rear of the head pipe 11. The garnish 102 (see FIGS. 1 and 16 described later) is attached to the extended end of the cowl stay 51. The rear portion of side cowl 81 is attached to the garnish 102. In other words, the rear portion of the side cowl 81 is supported on the cowl stay 51 through the garnish 102.

As for the front portion of the side cowl 81, as described below, is not attached to the cowl stay 51. Moreover, vehicle onboard components 104, 105 (see FIG. 2) are attached to the right and left of cowl stay 51, and use the space inside the side cowl 81 as a component layout space.

Figure 3:
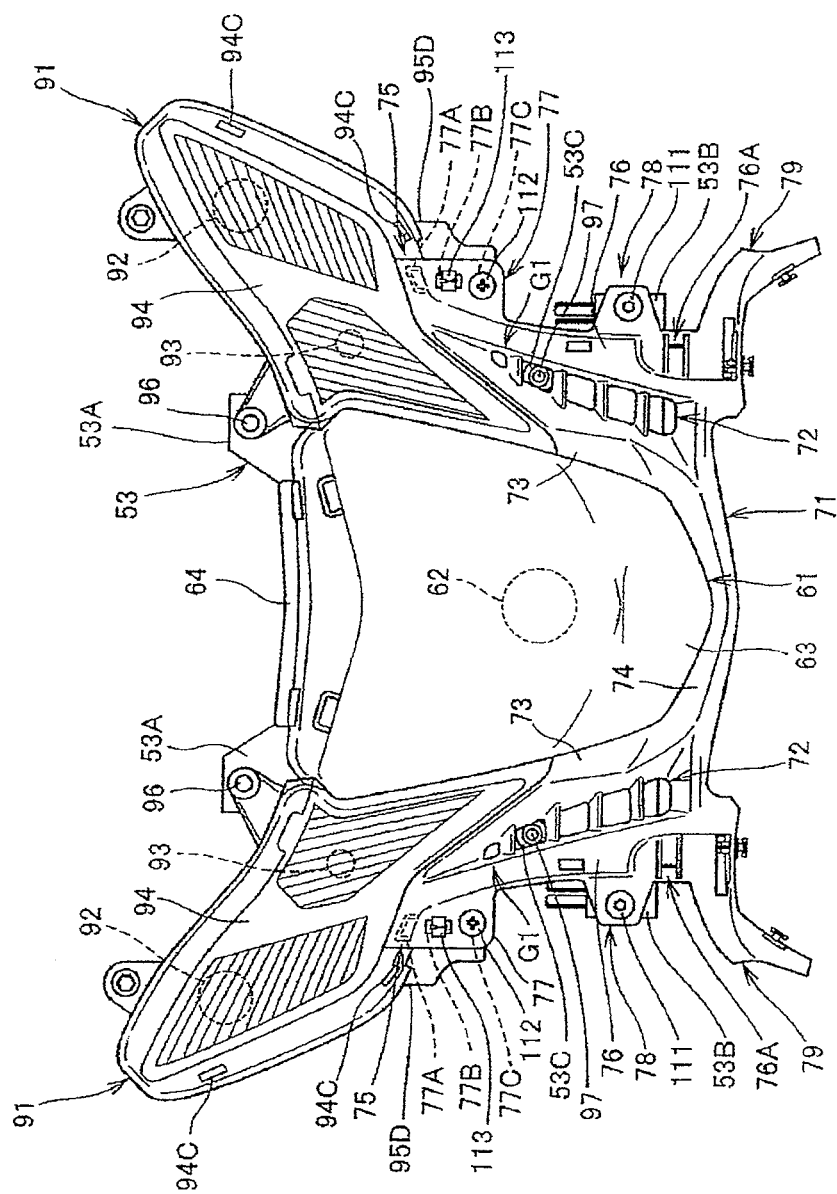
FIG. 3 is a drawing of the headlight stay viewed from the front surface with the peripheral parts.
Figure 4:
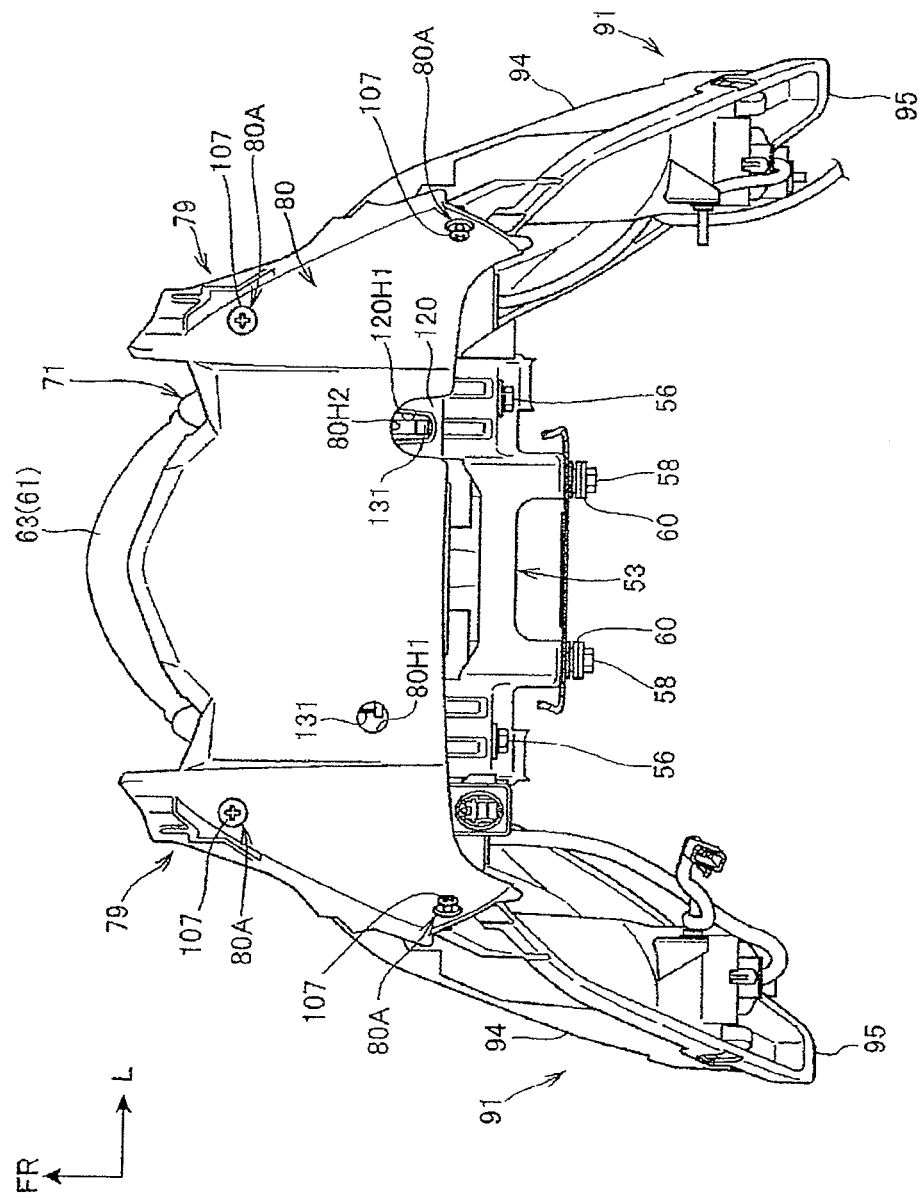
FIG. 4 is a drawing of the headlight stay viewed from in a downward direction with the peripheral parts.
Figure 5:
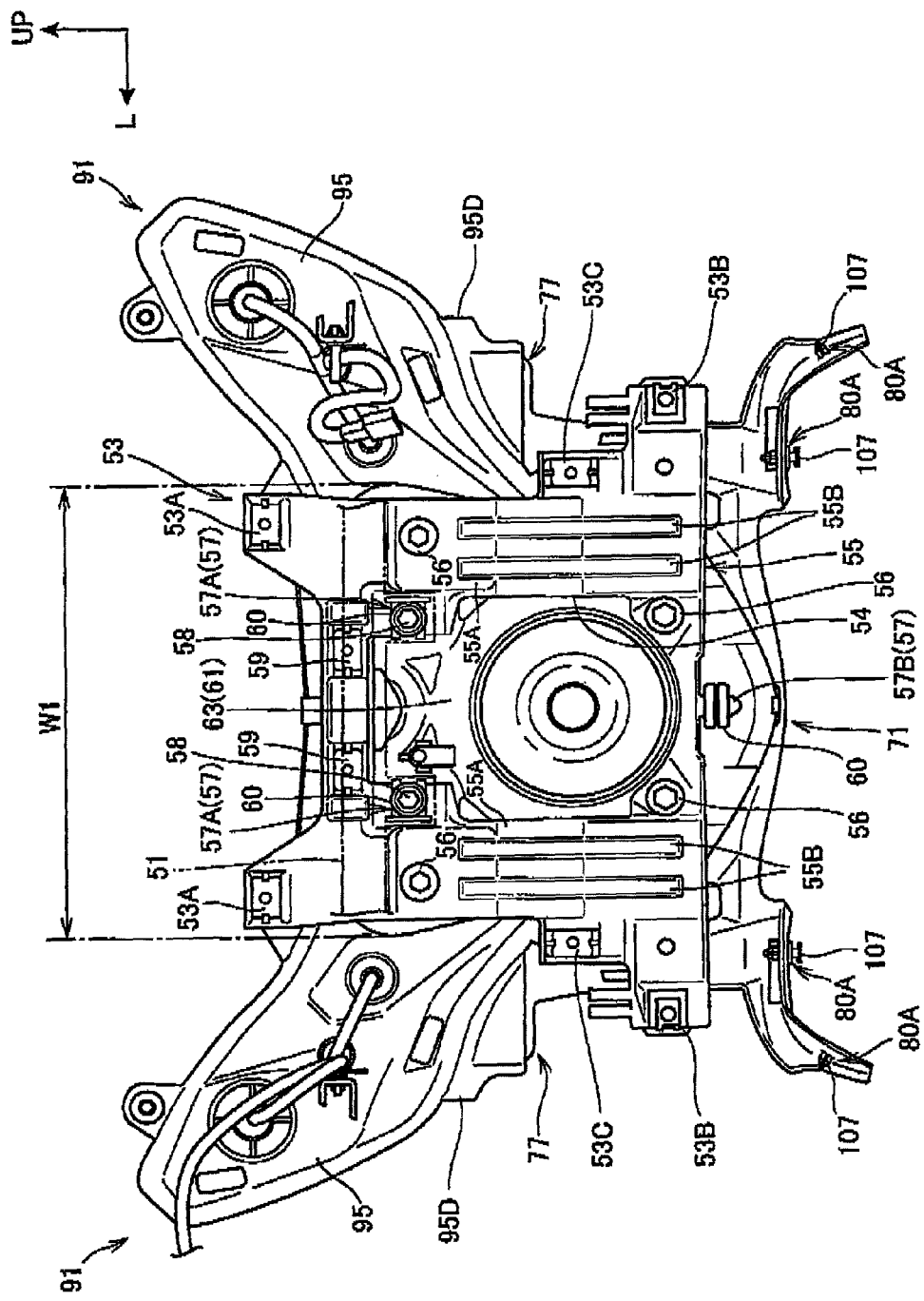
FIG. 5 is a drawing of the headlight stay viewed from the back side with the peripheral parts.
Figure 6:
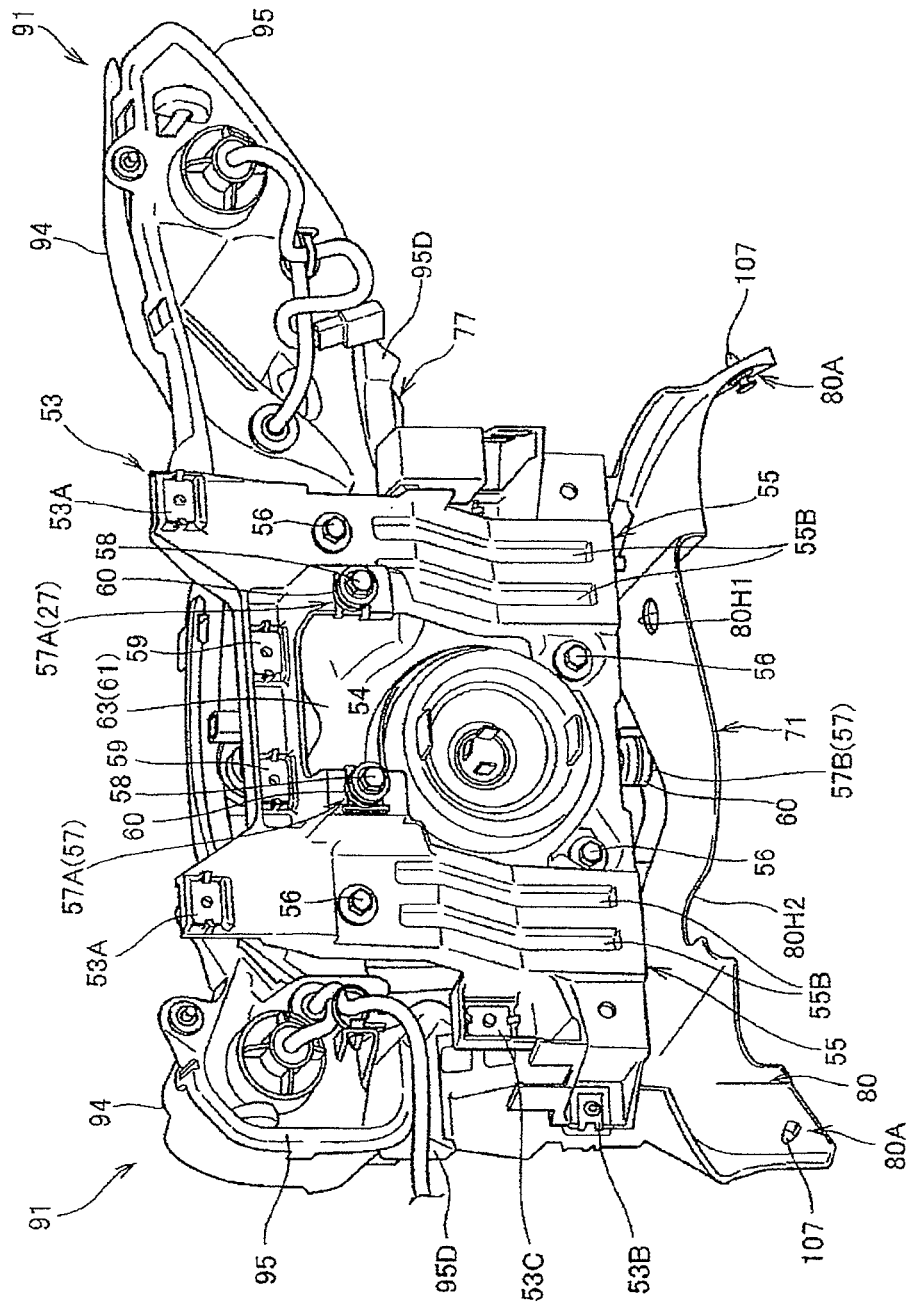
FIG. 6 is a drawing of the headlight stay viewed from the obliquely rear direction with the peripheral parts.

FIG. 3 is a drawing of the headlight stay 53 viewed from the front surface with the peripheral parts. FIG. 4 is a drawing viewed downwardly with the peripheral parts. FIG. 5 is a drawing viewed from the back side with the peripheral parts. FIG. 6 is a drawing of the headlight stay viewed from the obliquely rear direction with the peripheral parts.

As shown in FIGS. 3 to 6, the headlight stay 53 is a component in an approximate plate shape, made of resin material. The headlight stay 53 has a frame body 55 (see FIG. 5) with an opening portion 54 (see FIG. 5) at a center thereof. The headlight 61 is fixed to the frame body 55 with a plurality of (in the present structure 4 members) fastening members 56 (see FIG. 5).

More specifically, the headlight 61 has a head lamp 62 (see FIG. 1), a transparent resin lens 63 (see FIG. 1) covering the front surface of head lamp 62, and a resin housing 64 to which the head lamp 62 is attached. The housing 64 is applied to the front surface of the frame body 55 of the headlight stay 53, in this state, is fixed to the frame body 55 from the back side of the frame body 55 with a plurality of fastening members 56. The frame body 55 is formed narrower than the maximum width W1 of the housing 64 of the headlight 61, simultaneously, right and left of portions 55A (see FIGS. 5 and 6) of the opening portion 54 is formed widely within the maximum width W1. At the same time, a concave bar 55B (see FIGS. 5 and 6) extending vertically formed on this portion 55A, which enable a downsizing and secures rigidity.

As shown in FIGS. 5 and 6, a plurality of cowl stay connecting portions 57 are provided on the above-mentioned frame body 55, which are connected by sandwiching vibration isolation members (in the present structure, vibration isolation rubber) 60 between the cowl stay 51. The vibration isolation rubber 57 include a right and left pair of internal screw portions 57A provided above the opening portion 54 and a lower projecting portion 57B provided under the opening portion 54. The cowl stay 51 is fixed on the right and left pair of internal screw portions 57A with a fastening member 58 by sandwiching the vibration isolation member 60, the lower projecting portion 57B is inserted into the hole portion provided on the cowl stay 51 by sandwiching the vibration isolation member 60. Accordingly, the headlight stay 53 is supported to isolate the vibration to the cowl stay 51 at the three points.

Moreover, the above-mentioned frame body 55 integrally has a right and left pair of upper stay portions (first stay portions for blinker) 53A projecting upwardly from the frame body 55, a right and left pair of lower stay portions (stay portions for cover) 53B projecting to right and left from the lower portion of the frame body 55, a right and left pair of middle stay portions (second stay portions for blinker) 53C projecting right and left between the stay portions 53A, 53B. The stay portions 53A to 53C project to the upper and the right and left sides of blinker 91 when viewed from the front.

The upper stay portion 53A and the middle stay portion 53C function as a blinker stay to attach a blinker 91. The blinker 91 has a blinker lamp 92 and a position lamp 93, and comprise a transparent resin lens 94 covering the front surface of each lamp 92, 93 and a resin housing 95 on which each lamp 92, 93 is attached. Thus, each housing 95 to the right and left of blinkers 91 is attached to the right and left of upper stay portions 53A and the middle stay portion 53C with each fastening member (bolt) 96, 97 (see FIG. 3), and then is attached to the headlight stay 53.

Thus, since the headlight 61 and the blinker 91 are attached to the same headlight stay 53, the joint portion of the headlight 61 and the blinker 91 can be precisely positioned. Accordingly, in the present structure, an external appearance of a combination lamp can be formed as if the headlight 61 and the blinker 91 are originally integrated component. Moreover in FIG. 5, a sign 59 is a sensor mounting portion provided on the frame body 55 of the headlight stay 53, for attaching an inclination sensor (not shown).

Figure 7:
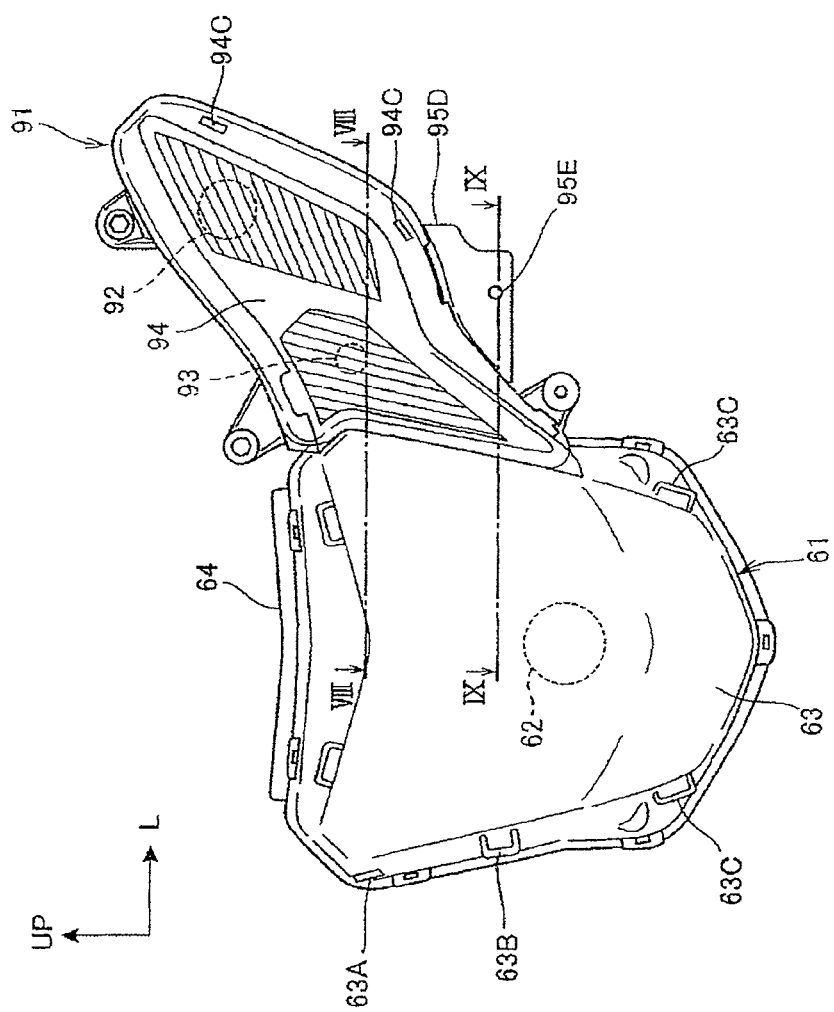
FIG. 7 is a drawing showing the installation condition of the headlight and the one blinker.
Figure 8:
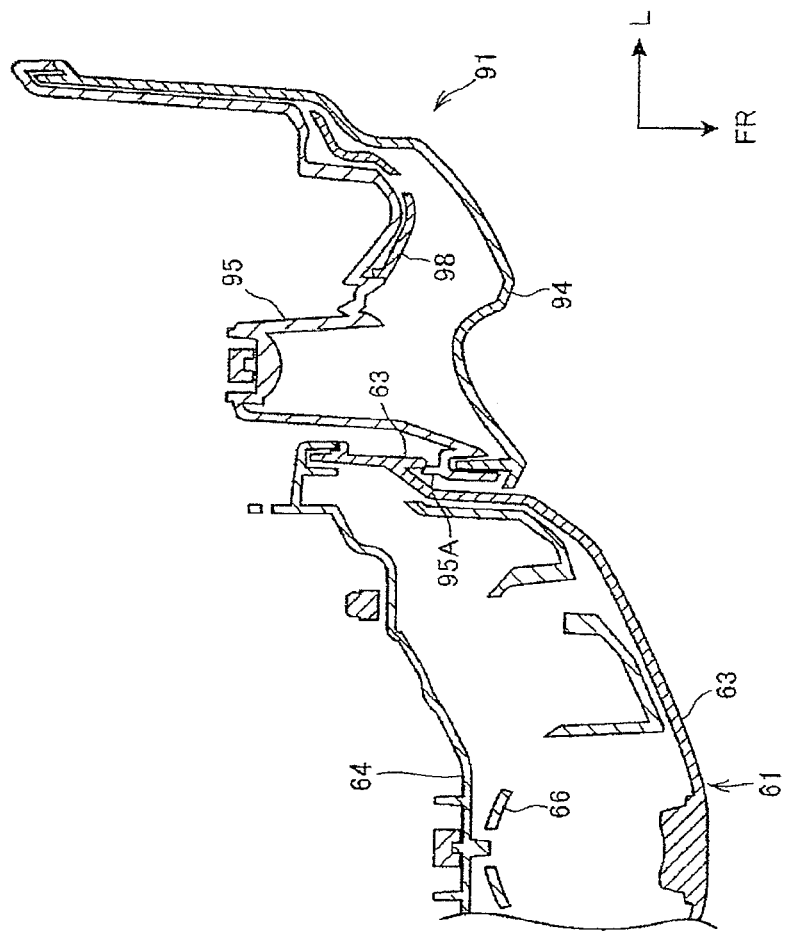
FIG. 8 is a cross section of VIII-VIII in FIG. 7.

FIG. 7 shows an attachment state of the headlight 61 and one end (left side) of the blinker 91. FIG. 8 shows a cross section of VIII-VIII in FIG. 7. FIG. 9 shows a cross section of IX-IX in FIG. 7.

An upper and lower pair of blinker engaging portions 63A, 63B are integrally provided which are engaged with each blinker 91 in the right and left sides of the lens 63 of the headlight 61. As shown in FIG. 8, a headlight engaging portion 95A provided on the housing 95 of the blinker 91 enters from the front and engages with the blinker engaging portion 63A in the upper side. As shown in FIG. 9, a headlight engaging portion 95B provided on the housing 95 of the blinker 91 enters from the front and engages with the blinker engaging portion 63B in the lower side. Accordingly, the headlight 61 and the blinker 91 can be precisely positioned. Thus, even though the headlight 61 and the blinker 91 are separately formed, the headlight 61 and the blinker 91 can be precisely positioned and certainly have the same external appearance as a combination lamp.

Moreover, in FIGS. 8 and 9, a reflector 66 is disposed inside the headlight 61, a reflector 98 is disposed inside the blinker 91.

FIG. 10(A) is a front view of the air intake cover 71 and FIG. 10(B) is a side view.

The air intake cover 71 is a middle cover member (an intermediate member) which can be seen from the outside between the side portion of the headlight 61 and the side cowl 81, has an air guide opening 72 penetrating in the front and rear direction, and introduces a flow of air from the front of the vehicle body through the air guide opening 72 to the inside of the front cowl 31.

The air intake cover 71 connects to the right and left sides of headlight 61, integrally has a side cover portion 73 having the above-mentioned air guide opening 72 and a crosslinking cover portion 74 bridging between lower portions of these side cover portions 73, and is formed in a symmetric form based on the center in the width direction of the vehicle. In addition, as shown in FIG. 5, the air intake cover 71 is slightly wider than the maximum width W1 of headlight 61, however, is formed as a relatively smaller component formed in narrower than the width of the headlight 61 including the right and left of blinkers 91.

The right and left of side cover portions 73 have a projecting portion 75 projecting over the joint portion (shown as a sign G1 in FIG. 10) with the inner end of the side cowl 81 to the outer side in the width direction of the vehicle and positioned in the back surface of the side cowl 31. The projecting portion 75 has a vertically extending portion 76 vertically extending along the joint portion G1, an upper side projecting portion 77 projecting vertically and spaced from the vertically extending portion 76 to the outer side in the width direction of the vehicle, a middle projecting portion 78, and lower side projecting portion 79.

Among these, the middle projecting portion 78 is attached to the lower stay portion 53B provided on the headlight stay 53 with fastening members 111 (see FIG. 2) inserted from the front.

In addition, a blinker engaging portion 77A which is an hook wherein a claw portion 94A provided in the blinker 91 (see FIG. 11 described later) is engaged with, a first side cowl engaging portion 77B which is a hole portion wherein a claw portion 83 (see FIG. 12 described later) provided in the side cowl 81 is engaged, a blinker attaching portion 77C which is a hole portion attached to the hole portion 95E (see FIG. 7) of a fixed portion 95D provided in the housing 95 of the blinker 91 with the clip member (attachment member) 112 (see FIG. 3 described later) are integrally formed. These blinker engaging portion 77A, first side cowl engaging portion 77B, and blinker mounting portion 77C are vertically spaced and adjacently disposed, and intensively disposed in the vicinity of the joint portion G1 with the side cowl 81.

Figure 11:
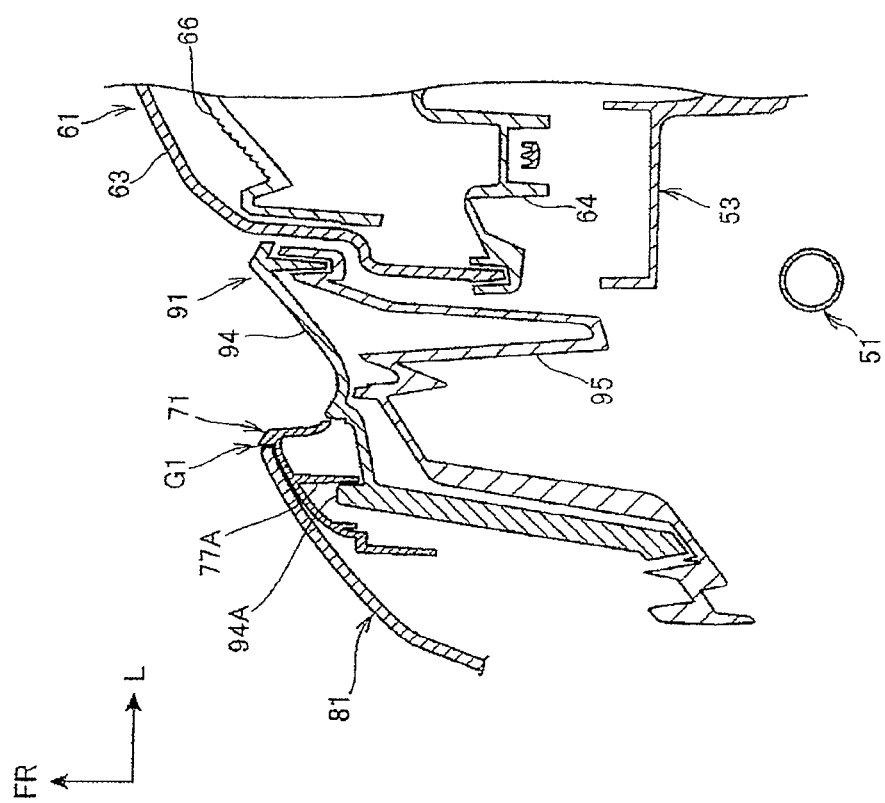
FIG. 11 is a cross section of XI-XI in FIG. 2.

FIG. 11 is a cross section of XI-XI (a cross section which cross the above-mentioned blinker engaging portion 77A) in FIG. 2. As shown in the drawing, the blinker engaging portion 77A of the air intake cover 71 is engaged with the claw portion 94A projecting forward from the lens 49 of the blinker 91.

The air intake cover 71 is positioned on the blinker 91 in the vicinity of the joint portion with the blinker 91 (shown as sign G2 in FIG. 10).

Figure 12:
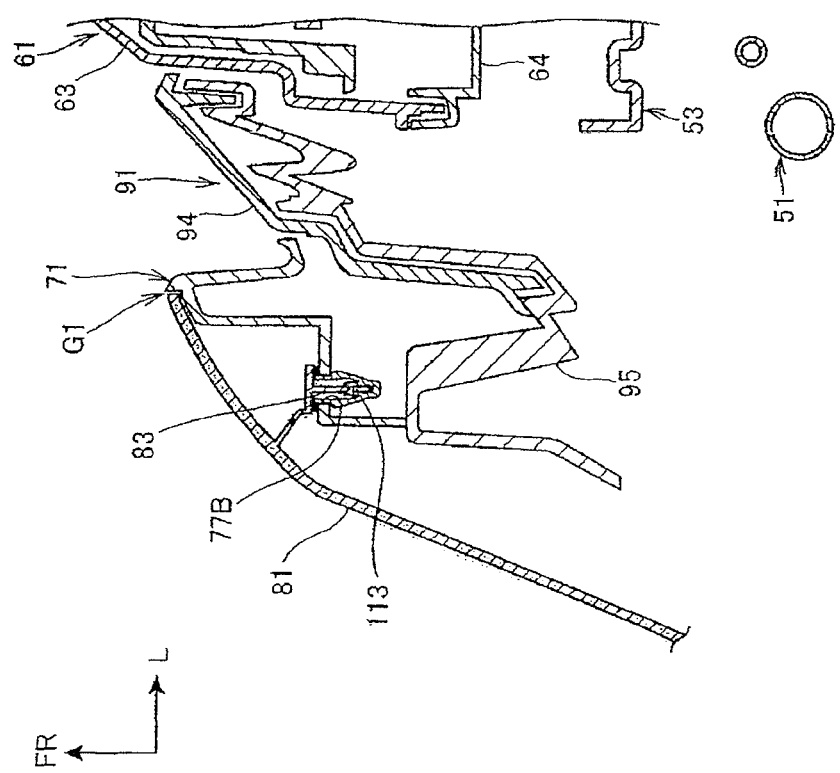
FIG. 12 is a cross section of XII-XII in FIG. 2.

FIG. 12 is a cross section of XII-XII (a cross section which cross the above-mentioned first side cowl engaging portion 77B) in FIG. 2, as shown in the drawing, a claw holder 113 is attached to the first side cowl engaging portion 77B of the air intake cover 71. The claw portion 83 projecting rearward from the side cowl 81 enters from the front and is held on the claw holder 113. Accordingly, the side cowl 81 is positioned on the air intake cover 71.

Figure 13:
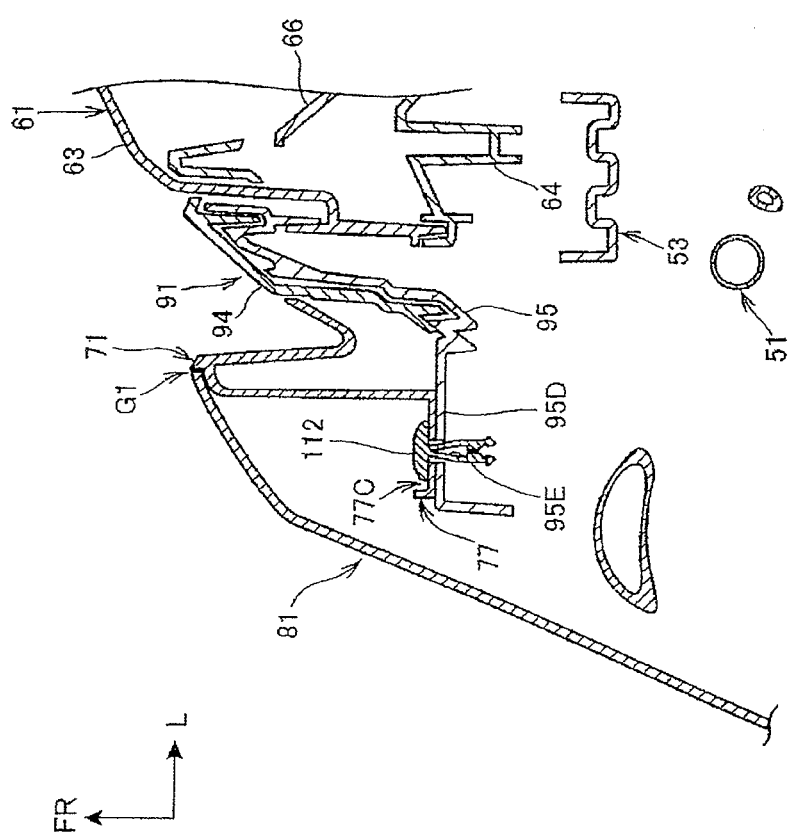
FIG. 13 is a cross section of XIII-XIII in FIG. 2.

FIG. 13 is a cross section of XIII-XIII (a cross section which crosses the above-mentioned blinker mounting portion 77C) in FIG. 2. As shown in the drawing, the blinker mounting portion 77C of the air intake cover 71 is communicated with a hole portion 95E provided in the fixed portion 95D of the housing 95 of the blinker 91. The clip member 112 is inserted into the communication hole from the front. The clip member 112 connects the air intake cover 71 and the blinker 91.

As shown in FIGS. 10(A) and 10(B), a second side cowl engaging portion 76A is integrally formed in a vertically extending portion 76 of the air intake cover 71, which is a claw portion engaged with the hole portion 84 (see FIG. 14 described later) provided in the side cowl 81.

Figure 14:
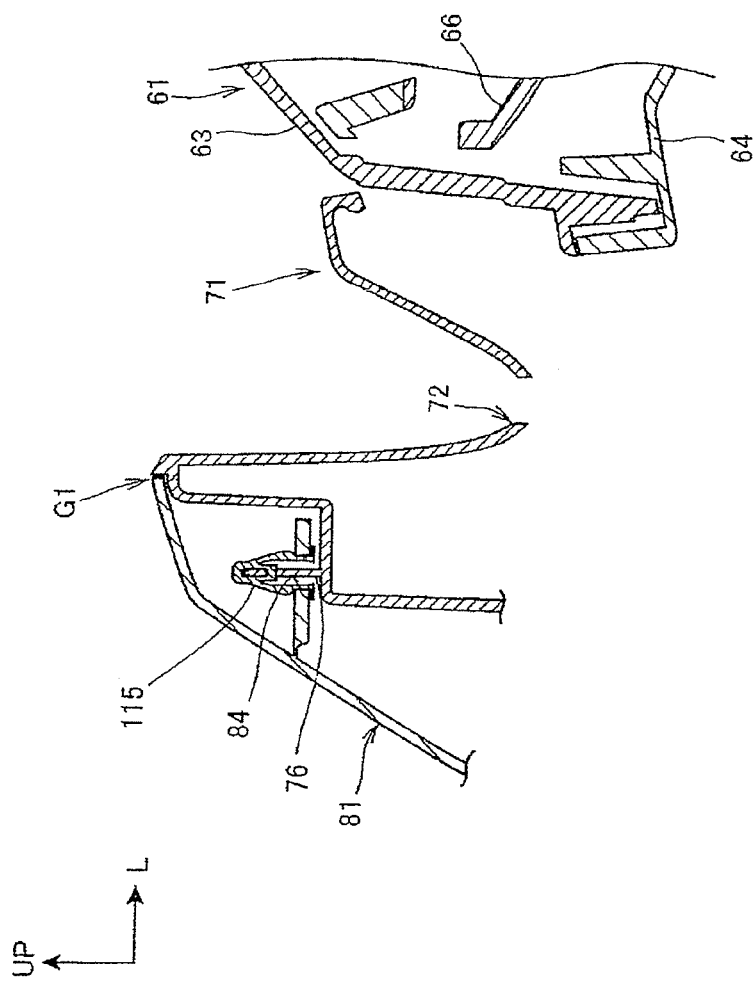
FIG. 14 is a cross section of XIV-XIV in FIG. 2.

FIG. 14 shows a cross section of XIV-XIV (a cross section which crosses the above-mentioned second side cowl engaging portion 76A) in FIG. 2. As shown in the drawing, a claw holder 115 is attached to the hole portion 84 of the side cowl 81. The second side cowl engaging portion 76A forwardly projecting from the air intake cover 71 enters and is held on the claw holder 115. Accordingly, the side cowl 81 and the air intake cover 71 are positioned.

In addition, as shown in FIGS. 11 to 14, a step portion, into which the front end of side cowl 81 is fitted, is formed on the joint portion G1 with the side cowl 81 in the air intake cover 71. The joint portion of air intake cover 71 and the side cowl 81 are more precisely positioned by the step portion.

As shown in FIG. 10(A), on the air intake cover 71 is formed a hook portion 140 on the inside end in the width direction of the vehicle of the joint portion G2 with the blinker 91. The hook portion 140 is hooked with the blinker 91, the air intake cover 71 can be positioned on the blinker 91 in the vicinity of the joint portion G2 with the blinker 91 by the hook portion 140.

Moreover, as shown in FIG. 7, an air intake cover engaging portion 63C engaged with a headlight engaging portion 71K (see FIG. 10(A)) provided on the air intake cover 71 is integrally provided in the right and left of lens 63 of the headlight 61. Accordingly, the headlight 61 and the air intake cover 71 can be positioned in the vicinity of the joint portion G3.

As shown in FIGS. 4 and 10, a lower plate portion 80 extending right and left is provided on the lower side projecting portion 79 of the air intake cover 71 so as to cover the lower portion of the headlight 61. A plurality of side cowl fixed portions 80A (at 4 points in the present structure) fixed with the side cowl 81 and a plurality of fastening members 107 (see FIG. 4) are provided on the lower plate portion 80.

Thus, since the air intake cover 71 is attached to the headlight stay 53 at the right and left of middle projecting portions 78, the air intake cover 71, the headlight 61 and the blinker 91 are attached to the same headlight stay 53, and these joint portions can be precisely positioned, simultaneously, an enough supporting rigidity can be gained.

Furthermore, the air intake cover 71 engages the blinker 91 with the blinker engaging portion 77A and the hook portion 140 which are in the vicinity of the joint portion G2 with the blinker 91, simultaneously, since the air intake cover 71 engages the headlight 61 with the headlight engaging portion 71K in the vicinity of the joint portion with the headlight 61 (shown as a sign G3 in FIG. 10). Thus, the air intake cover 71, the headlight 61 and the blinker 91 can be more precisely positioned.

In addition, the front portion of the side cowl 81 is attached to the lower side projecting portion 79 of the air intake cover 71, simultaneously, engages the air intake cover 71 with the first side cowl engaging portion 77B and the second side cowl engaging portion 76A in the vicinity of the joint portion G1 with the air intake cover 71, the side cowl 81 and the air intake cover 71 can be precisely jointed, simultaneously. Thus, enough supporting rigidity can be gained.

Moreover, an upper and lower pair of claw portions (side cowl engaging portion in the blinker side) 94C engaged with a blinker engaging portion 86 (see FIG. 15 described later) which is a hook provided on the side cowl 81 are integrally provided on the outside end in the width direction of the vehicle of the lens 94 of the blinker 91.

Figure 15:
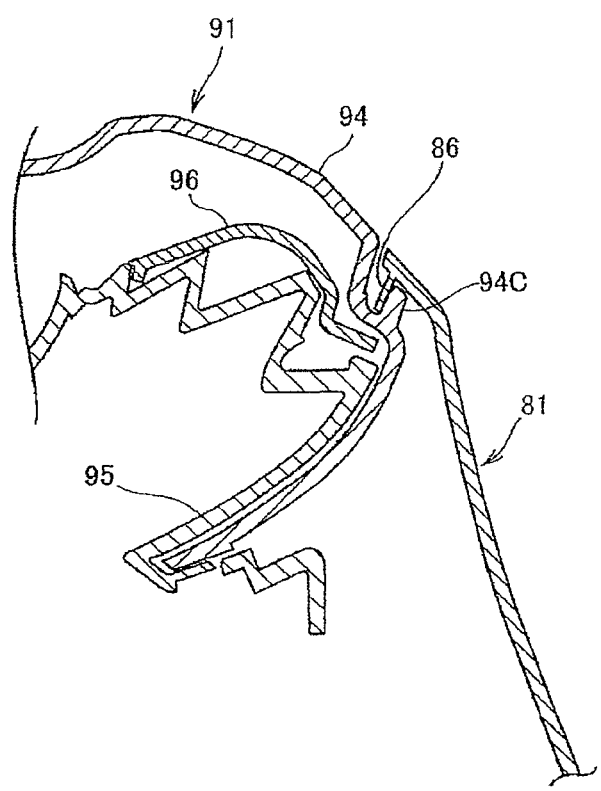
FIG. 15 is a cross section of XV-XV in FIG. 2.

FIG. 15 show a cross section of XV-XV (a cross section which crosses the claw portion 94C) in FIG. 2. As shown in the drawing, the blinker engaging portion 86 provided on the side cowl 81 enters from the upper and engages the claw portion 94C provided on the lens 94 of the blinker 91, the side cowl 81 is positioned on the blinker 91 in the vicinity of the joint portion with the blinker 91.

Meanwhile, in a structure wherein the air intake cover 71 which is a separate component is equipped between the side portion of headlight 61 and the side cowl 81, if the structure is changed such that the front portion of side cowl 81 is attached to the headlight stay 53, the headlight 61, the air intake cover 71 and the side cowl 81 are attached to the same headlight stay 53. Accordingly, these joint portions can be precisely positioned.

However, in this structure, the headlight stay 53 is needed to be larger than the air intake cover 71 to the outer side in the width direction of the vehicle. As shown as a two-dot chain line in FIG. 16, corresponding to the enlargement of the width of the headlight stay 53. Thus, the width of the front portion of side cowl 81 becomes wider. This causes an increase in the operating resistance and an enlargement of the cowl.

Meanwhile, in the present embodiment, the front portion of side cowl 81 is not attached to the cowl stay 51 and the headlight stay 53. Instead the front portion of the side cowl 81 is attached to the air intake cover 71. The air intake cover 71 and the headlight 61 are supported on the headlight stay 53, together. Simultaneously, since the first and second side cowl engaging portions 77B, 76A (see FIG. 2) engaged with the side cowl 81 are provided in the vicinity of the joint portion G1 with the side cowl 81, the enlargement of the width of the headlight stay 53 can be prevented. Accordingly, in the present embodiment, as shown as a full line in FIG. 16, the headlight stay 53 can be formed narrower. Corresponding to the reduced amount, the front portion of the side cowl 81 can be reduced. Thus, the width of the front portion of side cowl 81 is reduced, which results in decreasing the operating resistance and in reducing the size of the front portion of the cowl.

Next, the optical axis adjustment (aiming) of the headlight 61 will be explained.

Optical axis adjusting bolts 131 (see FIG. 4) (also called as aiming bolts) to aim the headlight 61 are provided at two points on the back side of the headlight 61.

As shown in FIG. 4, due to the fact that the lower plate portion 80 of the air intake cover 71 and the lower plate portion 120 of the headlight stay 53 exist in the downward direction of the headlight 61, the lower plate portions 80, 120 exist in the downward direction of the optical axis adjusting bolt 131 which is an optical axis adjusting portion of the headlight 61. As shown in FIG. 4, the lower plate portions 80, 120 in the present embodiment are provided with a hole portion 80H1 heading for the optical axis adjusting bolt 131 and cutout portions 80H2, 120H1. Accordingly, the optical axis adjusting bolt 131 can be accessed without removing the front cowl 31 and can adjust the optical axis by using predetermined tools inserted from the lower part of front cowl 31 through the above-mentioned hole portion 80H1 and the cutout portions 80H2, 120H1.

Moreover, the motorcycle 1 has a canister 201 to temporarily absorb the evaporated fuel generated by the evaporation of the liquid fuel inside the fuel tank.

Figure 17:
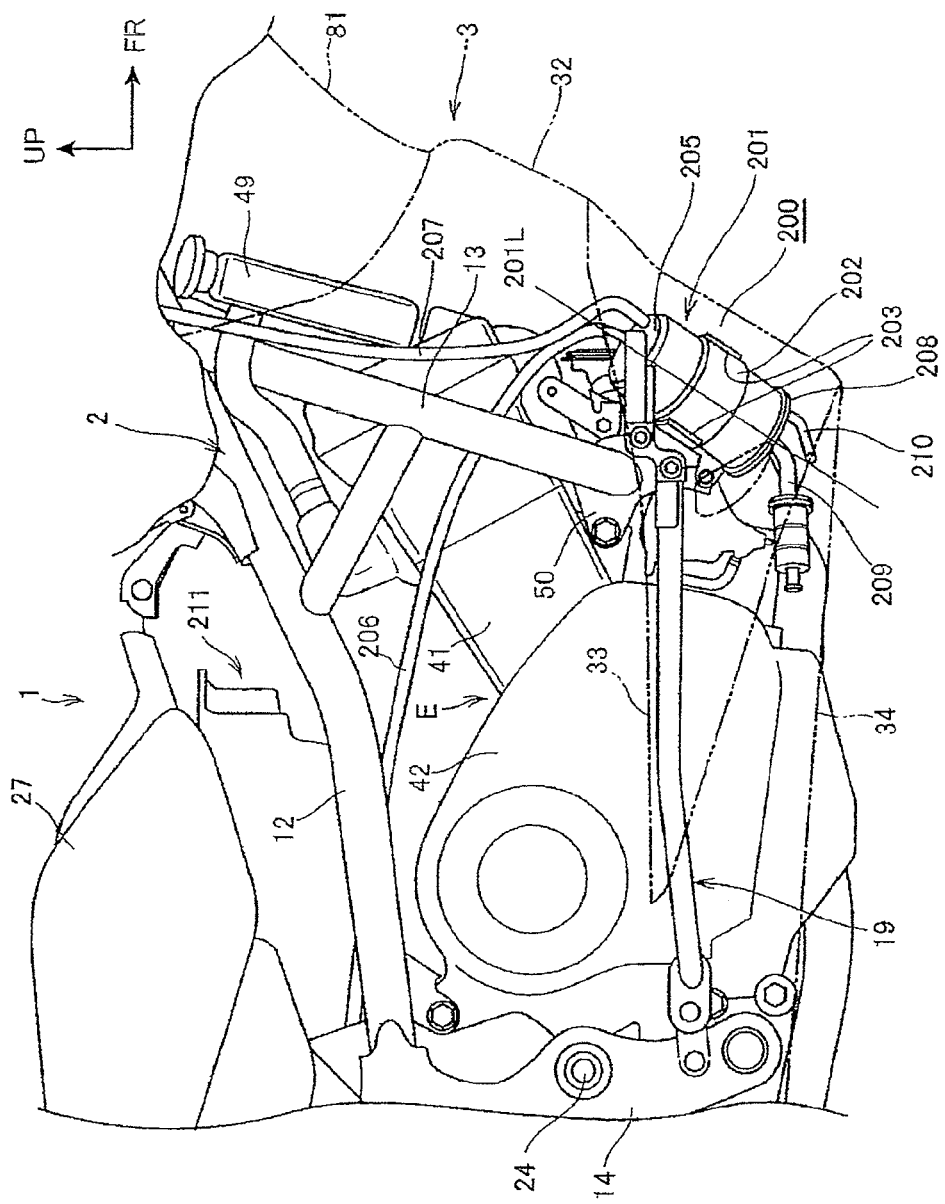
FIG. 17 is drawing of the canister viewed from the right side of the vehicle body with the peripheral structure.

FIG. 17 is a drawing of the canister 201 viewed from the right side of the vehicle body with the peripheral structure. As shown in the drawing, the canister 201 is disposed in a space portion 200 between the right under cover 34 and the engine E. More specifically, the canister 201 has a hollow and cylindrical shape, a rubber ring 202 is wound around the canister 201, the claw member 203 fixed on the an engine bracket 50 supporting the front lower portion of the engine E is engaged with the rubber ring 202, which results in that the canister 201 being fixed on the above-mentioned space portion 200.

In this case, the canister 201 is disposed in a posture wherein a center shaft 201L is inclined upwardly toward the front along the under cover 34. When viewed from the side of the vehicle body, the canister 201 is positioned in front of the engine bracket 50 and the down frame 13, as well as, behind the front end of the under cover 34, and in the vicinity of the lower end of the under cover 34. In addition, the canister 201 is positioned in the inner side than the supporting frame 19 supporting the step portion 33 and the under cover 34 in the width direction of the vehicle, in the outer side than the exhaust pipe 46 extending downward in the width direction of the vehicle from the cylinder portion 41. Accordingly, the canister 201 can be arranged using a vacant space (space portion 200) surrounded by these members.

A charge pipe 206 for supplying the evaporated fuel from the fuel tank and a purge pipe 207 sending out the evaporated fuel inside the canister 201 are connected to an upper surface portion 205 of the canister 201. An air opening tube 209 for introducing the fresh air inside the canister 201 and a drain pipe 210 are connected to a lower surface portion 208. The other end of the above-mentioned purge pipe 207 is connected to a purge control valve (not shown) disposed above the engine E, the purge control valve supplies the evaporated fuel absorbed inside the canister 201 to the engine inlet system using the intake pressure of the engine E, which results in that the engine E burns the fuel.

Figure 18:
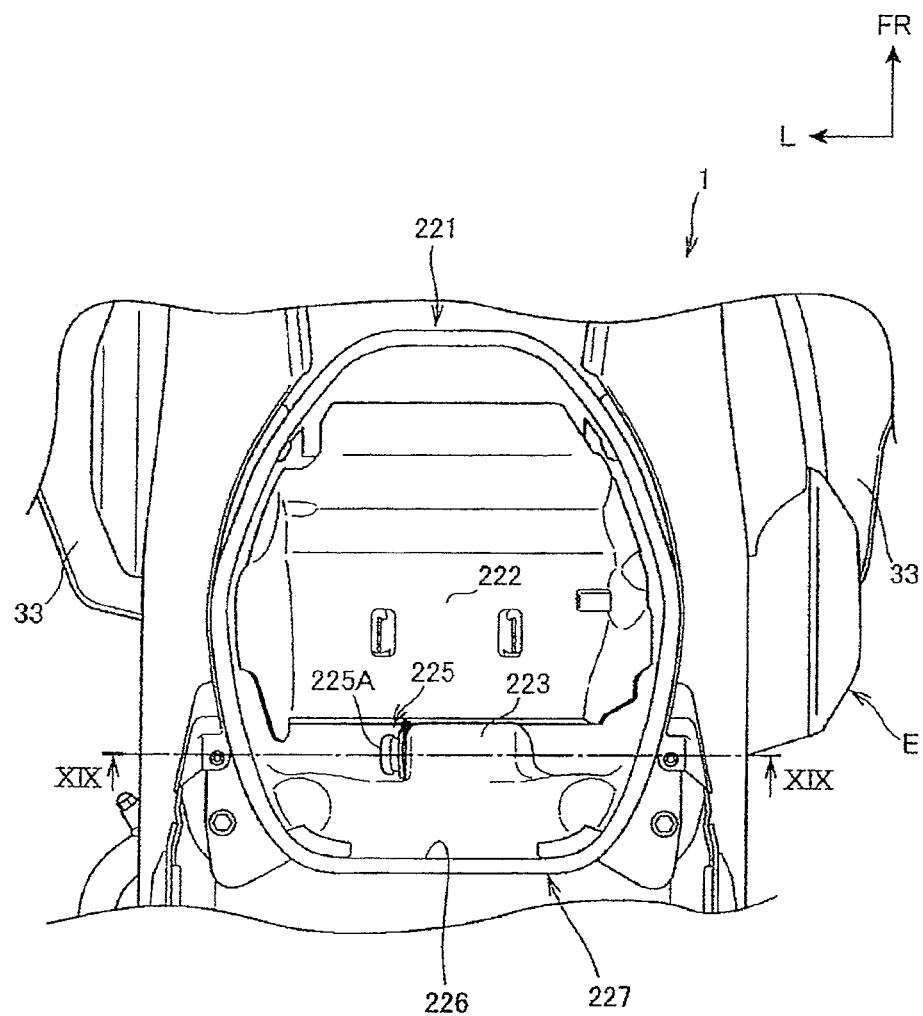
FIG. 18 is a drawing of the storage box viewed from the upper side with the peripheral structure.
Figure 19:
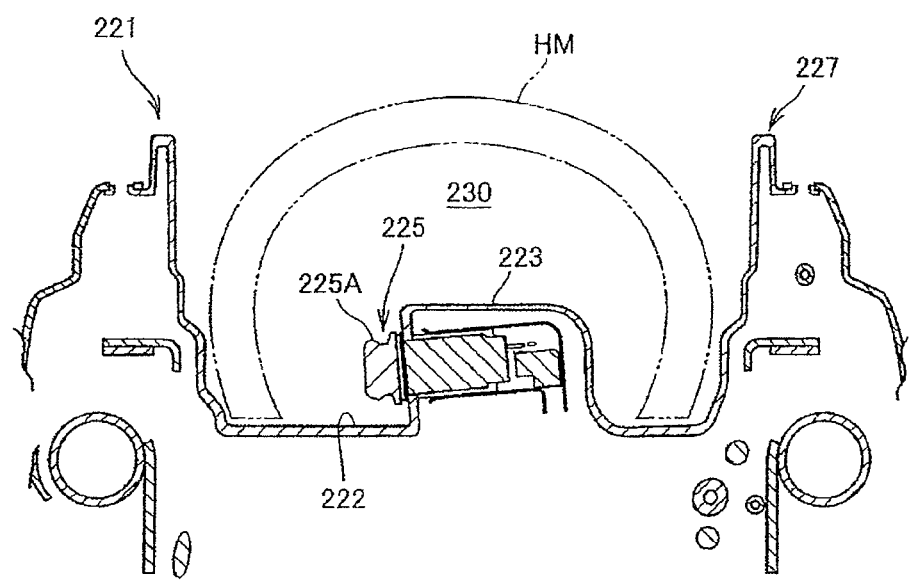
FIG. 19 is a cross section of XIX-XIX in FIG. 18.

Moreover, a storage box 221 is disposed in the downward direction of the sitting seat 27 of the motorcycle 1. FIG. 18 is a drawing of the storage box 221 viewed from the upper side with the peripheral structure. FIG. 19 is a cross section of XIX-XIX in FIG. 18.

The storage box 221 has a box shape with the upper opening, a hinge portion (not shown) is provided at the front end of the sitting seat 27. The storage box 221 is opened and closed by the sitting seat 27 that vertically rotates by using the front end as a fulcrum point.

DC socket 225 is provided for the external output of the battery source of motorcycle 1 inside of the storage box 221 which enables a battery charging of a mobile phone. The DC socket 225 is buried, only exposing a socket opening 225A in one end side (left side), and disposed, as it is called, sideways in the horizontally long swelling portion 223 swelling upwardly from the bottom plate 222 of the storage box 221.

More specifically, the DC socket 225 is arranged at the position apart a predetermined distance from the center of the bottom plate 222 in the width direction of the vehicle, as well as, from surrounding wall 227 including a rear wall 226. An axis line 225L of the DC socket 225 is fixed in a posture wherein the socket opening 225A is fixed along the width direction of the vehicle, when viewed from the upper surface (see FIG. 18), and in a posture wherein the socket opening 225A is fixed inclined downwardly so as to be lower than the horizontal line, when viewed from the longitudinal section (see FIG. 19). In addition, the DC socket 225 is provided above the bottom plate 222.

According to the arrangement, as shown in FIG. 19, when a so-called semi-cap type of helmet HM is stored inside the storage box 221, the DC socket 225 is positioned inside the inner space (so-called covered space) 230 of the helmet HM, not to prevent the storage of the helmet HM. Furthermore, since the socket opening 225A faces obliquely downwardly, if water and dust enter the storage box 221, the water and dust can be prevented from entering inside the socket opening 225A.

As mentioned above, in the present embodiment, as shown in FIG. 2, a separate air intake cover (intermediate member) 71 between the side portion of the headlight 61 and the side cowl 81 is attached to the headlight stay 53 with the headlight 61, simultaneously, with the side cowl engaging portions 77B, 76A disposed behind the side cowl 81 and with the side cowl 81 being engaged in the vicinity of the joint portion G1 with the side cowl 81. Accordingly, in a structure with separate components provided between the side portion of the headlight 61 and the side cowl 81, compared to the case wherein the side cowl 81 is fixed on the headlight stay 53 (see the two-dot line in FIG. 16), the width of the front portion of side cowl 81 can be reduced.

In this case, since the headlight 61 and the air intake cover 71, which is a separate component, are attached to the same headlight stay 53, both of components can be precisely positioned. Furthermore, since the air intake cover 71 and the side cowl 81 engage each other, both of components can be precisely positioned. Therefore, the headlight 61, the air intake cover 71, and the side cowl 81 can be precisely positioned, preventing the increase in width of the front portion of side cowl 81.

In addition, in the present embodiment, as shown in FIGS. 3 and 5, since the headlight stay 53 is formed narrower than the air intake cover 71, the situation wherein the headlight stay 53 causes an increase in the width of the front portion of side cowl 81 is prevented. Thus, the width of the front portion of side cowl 81 can be efficiently reduced.

Moreover, in the present embodiment, the blinker 91 is equipped, which is attached to the headlight stay 53 and is adjacent to the right and left of headlight 61 as well as to the upper of air intake cover 71. Since the blinker 91 has a claw portion (intermediate member engaging portion) 94A (see FIG. 11) which is deposed behind the air intake cover 71 and is engaged with the air intake cover 71 in the vicinity of the joint portion G2 of the air intake cover 71, the headlight 61 and the blinker 91 are adjacent to each other and fixed on the same headlight stay 53. Thus, the elements can be sub-assembled to the headlight stay 53 as a so-called combination lamp while these are precisely positioned. Furthermore, since the blinker 91 and the air intake cover 71 engage each other, the blinker 91 and the air intake cover 71 can be precisely positioned.

Moreover, the blinker 91 has the blinker lamp 92, the lens 94, and the housing 95. The air intake cover 71 and the housing 95 of the blinker 91 are attached with the clip member (attachment member) 112 (see FIGS. 3 and 13). The clip member 112, the side cowl engaging portion 77B, the claw portion 94A are provided to be adjacent to each other. Since the attachment or engagement position of air intake cover 71, the blinker 91, and the side cowl 81 are adjacent to each other, these components can be more easily and precisely positioned. As a result, the combination lamp has an external appearance which looks as if the headlight and the blinker are integrally formed even though the headlight and the blinker are separate components.

Moreover, the headlight 61 has the head lamp 62, the lens 63, and the housing 64. As the lens 63 of the headlight 61 has the blinker engaging portions 63A, 63B (see FIG. 7) engaged with the blinker 91 to integrate the headlight 61 and the blinker 91, the joint portion of the headlight 61 and the blinker 91 which are separate components can be precisely positioned and the external appearance as a combination lamp can be increased.

Moreover, since the lens 94 of the blinker 91 has a claw portion (blinker side cowl engaging portion) 94C (see FIGS. 2, 3, and 15) which is engaged with the side cowl 81, the blinker 91 and the side cowl 81 are more easily and precisely positioned. The joint portion of these can be precisely positioned.

In addition, as shown in FIG. 4, since the lower plate portion 120 of headlight stay 53 and the lower plate portion 80 of air intake cover 71 are arranged under the aiming bolt 131 which is an optical axis adjusting portion of the headlight 61, the hole portion 80H1 communicated with aiming bolt 131 and the cutout portions 80H2, 120H1 are provided in both of lower plate portions 120, 80, the headlight stay 53 and the aiming bolt 131 behind the air intake cover 71 can be accessed, this makes the aiming possible.

It is obvious that the above-mentioned embodiment only shows one example and various modifications and improvements can be made without departing from the scopes of the claims of the present invention.

For example, the above-mentioned embodiment explains the case wherein a separate air intake cover 71 is equipped between the side portion of headlight 61 and the side cowl 81, however, not only the air intake cover 71, but also other cover components may be equipped. Moreover, the above-mentioned embodiment explains the case wherein the blinker 91 is arranged above the air intake cover 71. However, the blinker 91 may be arranged in a different position.

Furthermore, the above-mentioned embodiment explains the case wherein the present invention is applied to the front structure of the motorcycle 1 shown in FIG. 1 and the like. However, the present invention is not limited to this and can be applied widely for a heretofore known front structure of straddle type vehicle. In addition, the straddle type vehicle includes whole type of vehicles wherein a rider straddles on the vehicle body, and is a vehicle including not only two-wheeled motorcycles (including motorized bicycle), but also three-wheeled cycles and four-wheeled vehicles classified as ATV (all-terrain vehicle).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A front structure of straddle vehicle comprising:
   a body frame;
   right and left side cowls arranged in front of the body frame;
   a cowl stay provided on the front portion of the body frame;
   a headlight stay supporting a headlight is attached to the cowl stay, and
   a separate intermediate member attached to a lower portion of the headlight stay supporting the headlight, simultaneously, and
   the intermediate member including:
   two side cowl engaging portions on the right side cowl for engaging the right side cowl in a vicinity of a joint portion of the right side cowl, and
   two additional side cowl engaging portions on the left side cowl for engaging the left side cowl in a vicinity of a joint portion of the left side cowl,
   wherein the headlight stay includes an upper stay portion, a middle stay portion, and a lower stay portion arranged on right and left sides of a headlight housing of the headlight stay, and
   the upper stay portions of the headlight stay extend upwardly from the headlight housing of the headlight stay.

2. The front structure of straddle vehicle according to claim 1, and further comprising:
   a blinker attached to the headlight stay adjacent to a right and a left of the headlight and to an upper portion of the intermediate member, wherein the upper stay portions are arranged between the right and left side blinkers, and
   each of the blinkers includes an intermediate member engaging portion disposed behind the intermediate member and engaged with the intermediate member in the vicinity of the joint portions of the right and left side cowls.

3. The front structure of straddle vehicle according to claim 2, wherein each of the right and left blinkers includes:
   a blinker lamp, a lens, and a blinker housing,
   wherein the intermediate member and the blinker housing of each of the blinkers are attached with an attachment member, and
   the attachment member, the side cowl engaging portion, and the intermediate member engaging portion on each of the right and left sides of the front structure are provided to be adjacent to each other.

4. The front structure of straddle vehicle according to claim 2, wherein headlight includes:
   a lamp, a lens and the headlight housing, and the lens of the headlight includes blinker engaging portions engaged with each of the blinkers to integrate the headlight and each of the blinkers.

5. The front structure of straddle vehicle according to claim 1, wherein the headlight stay has a frame body and the headlight is fixed to the frame body with four fastening members, and a width of the frame body is narrower than a maximum width of the headlight housing.

6. The front structure of straddle vehicle according to claim 2, wherein each of the right and left blinkers includes:
a blinker lamp, a lens, and a blinker housing, and
the lens of each of the blinkers includes a side cowl engaging portion on an outer side of each of the blinkers engaged with a corresponding one of the right and left side cowls.

7. The front structure of straddle vehicle according to claim 3, wherein each of the right and left blinkers includes:
the blinker lamp, the lens, and the blinker housing, and
the lens of each of the blinkers includes a side cowl engaging portion on an outer side of each of the blinkers engaged with a corresponding one of the right and left side cowls.

8. The front structure of straddle vehicle according to claim 4, wherein each of the right and left blinkers includes the blinker lamp, the lens, and a blinker housing, and
the lens of each of the blinkers includes a side cowl engaging portion on an outer side engaged with a corresponding one of the right and left side cowls.

9. The front structure of straddle vehicle according to claim 1, wherein a lower plate portion of the headlight stay and a lower plate portion of the intermediate member are arranged under an optical axis adjusting portion of the headlight, and a hole portion in communication with the optical axis adjusting portion or cutout portions is provided in both of the lower plate portions.

10. The front structure of straddle vehicle according to claim 2, wherein a lower plate portion of the headlight stay and a lower plate portion of the intermediate member are arranged under an optical axis adjusting portion of the headlight, and
a hole portion in communication with the optical axis adjusting portion or cutout portions is provided in both of the lower plate portions.

11. The front structure of straddle vehicle according to claim 1, wherein the headlight stay is formed narrower than the intermediate member.

12. A front structure adapted to be used with a straddle vehicle comprising:
right and left side cowls;
a cowl stay operatively provided on the front portion of the body frame;
a headlight stay for supporting a headlight,
the headlight stay being attached to the cowl stay, and
a front structure of straddle vehicle includes a separate intermediate member attached to the headlight stay with the headlight, simultaneously, and
the intermediate member including:
two side cowl engaging portions on the right side cowl for engaging the right side cowl in a vicinity of a joint portion of the right side cowl, and
two additional side cowl engaging portions on the left side cowl for engaging the left side cowl in a vicinity of a joint portion of the left side cowl,
wherein the headlight stay includes an upper stay portion, a middle stay portion, and a lower stay portion arranged on right and left sides of a headlight housing of the headlight stay, and
the middle stay portions and the lower stay portions are spaced apart from each other further in a lateral direction than the upper stay portions are spaced apart from each other.

13. The front structure of straddle vehicle according to claim 12, and further comprising:
a blinker attached to the headlight stay adjacent to a right and a left of the headlight and to an upper portion of the intermediate member, wherein the upper stay portions are arranged between the right and left side blinkers, and
each of the blinkers includes an intermediate member engaging portion disposed behind the intermediate member and engaged with the intermediate member in the vicinity of the joint portions of the right and left side cowls.

14. The front structure of straddle vehicle according to claim 13, wherein each of the right and left blinkers includes:
a blinker lamp, a lens, and a blinker housing,
wherein the intermediate member and the housing of each of the blinkers are attached with the attachment member, and
the attachment member, the side cowl engaging portion and the intermediate member engaging portion on each of the right and left sides of the front structure are provided to be adjacent to each other.

15. The front structure of straddle vehicle according to claim 12, wherein the headlight includes:
a lamp, a lens and the headlight housing, and
the lens of the headlight includes blinker engaging portions engaged with each of the blinkers to integrate the headlight and each of the blinkers.

16. The front structure of straddle vehicle according to claim 12, wherein a lower plate portion of the headlight stay and a lower plate portion of the intermediate member are arranged under an optical axis adjusting portion of the headlight, and a hole portion in communication with the optical axis adjusting portion or cutout portions is provided in both of the lower plate portions.

17. The front structure of straddle vehicle according to claim 12, wherein the headlight stay has a frame body and the headlight is fixed to the frame body with four fastening members, and a width of the frame body is narrower than a maximum width of the headlight housing.

18. A front structure adapted to be used with a straddle vehicle comprising:
right and left side cowls;
a cowl stay operatively provided on the front portion of the body frame;
a headlight stay for supporting a headlight,
the headlight stay being attached to the cowl stay, and
a front structure of straddle vehicle includes a separate intermediate member attached to the headlight stay with the headlight, simultaneously, and
a right side cowl engaging portion with which the right side cowl is engaged in a vicinity of a joint portion of the right side cowl, and
a left side cowl engaging portion with which the left side cowl is engaged in a vicinity of a joint portion of the left side cowl,
wherein the intermediate member extends further in a right side direction of the vehicle than the right side cowl engaging portion, and further in a left side direction of the vehicle than the left side cowl engaging portion,
wherein the headlight stay includes an upper stay portion, a middle stay portion, and a lower stay portion arranged on right and left sides of a headlight housing of the headlight stay, and
the lower stay portions are spaced apart further from each other in a lateral direction than the middle stay portions are spaced apart from each other, and the the middle stay portions are spaced apart further from each other in a lateral direction than the upper stay portions are spaced apart from each other.

19. The front structure of straddle vehicle according to claim 18, and further comprising:
  a blinker attached to the headlight stay adjacent to a right and a left of the headlight and to an upper portion of the intermediate member, wherein the upper stay portions are arranged between the right and left side blinkers, and
  each of the blinkers includes an intermediate member engaging portion disposed behind the intermediate member and engaged with the intermediate member in the vicinity of the joint portions of the right and left side cowls.

20. The front structure of straddle vehicle according to claim 18, wherein the headlight stay has a frame body and the headlight is fixed to the frame body with four fastening members, and a width of the frame body is narrower than a maximum width of the headlight housing.

* * * * *